(12) United States Patent
Felter et al.

(10) Patent No.: US 7,444,526 B2
(45) Date of Patent: Oct. 28, 2008

(54) PERFORMANCE CONSERVING METHOD FOR REDUCING POWER CONSUMPTION IN A SERVER SYSTEM

(75) Inventors: Wesley Michael Felter, Austin, TX (US); Thomas Walter Keller, Jr., Austin, TX (US); Karthick Rajamani, Austin, TX (US); Cosmin Rusu, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 11/154,160

(22) Filed: Jun. 16, 2005

(65) Prior Publication Data

US 2006/0288241 A1    Dec. 21, 2006

(51) Int. Cl.
 G06F 1/00     (2006.01)
 G06F 1/26     (2006.01)
 G06F 1/32     (2006.01)

(52) U.S. Cl. ...................... 713/300; 713/320
(58) Field of Classification Search ................. 713/300, 713/320, 322, 324
See application file for complete search history.

(56) References Cited

U.S. PATENT DOCUMENTS

| | | | |
|---|---|---|---|
| 5,623,647 A | 4/1997 | Maitra | |
| 5,719,800 A | 2/1998 | Mittal | |
| 6,167,330 A * | 12/2000 | Linderman | .................. 700/295 |
| 6,415,388 B1 | 7/2002 | Browning | |
| 6,564,328 B1 | 5/2003 | Grochowski | |
| 6,574,740 B1 | 6/2003 | Odaohhara | |
| 2001/0044909 A1 | 11/2001 | Oh | |
| 2003/0126475 A1 * | 7/2003 | Bodas | ........................ 713/300 |
| 2003/0126478 A1 | 7/2003 | Burns | |
| 2003/0126479 A1 | 7/2003 | Burns | |
| 2003/0188210 A1 | 10/2003 | Nakazato | |
| 2003/0217296 A1 | 11/2003 | Ma | |
| 2003/0229821 A1 | 12/2003 | Ma | |
| 2004/0064745 A1 | 4/2004 | Kadambi | |
| 2005/0125703 A1 * | 6/2005 | Lefurgy et al. | ............... 713/320 |

\* cited by examiner

Primary Examiner—Mark Connolly
(74) Attorney, Agent, or Firm—Casimer K. Salys; Dillon & Yudell LLP

(57) ABSTRACT

A method for managing power in a data processing system having multiple components includes determining a power budget for the system. Activity levels during a forthcoming time interval are then predicted for each of the components. Using the predicted activity levels, the power budget is allocated among the system components. An activity limit is then established for each component based on its corresponding portion of the power budget. The activity of a component is then monitored and, if the component's activity exceeds the component's corresponding activity limit, constrained. Determining the predicted level of activity may include determining a predicted number of instructions dispatched by a processor component or a predicted number of memory requests serviced for a system memory component. Allocating the power budget includes allocating each component its corresponding standby power and a share of the system power available for dynamic powering based on the expected levels of activity.

2 Claims, 5 Drawing Sheets

PERFORMANCE CONSERVING METHOD FOR REDUCING POWER CONSUMPTION IN A SERVER SYSTEM

BACKGROUND

1. Field of the Present Invention

The invention is in the field of data processing systems and more particularly power management within a data processing system.

2. History of Related Art

As the packing density and computing frequency of data processing system (computer) components increases, their power consumption becomes a limiting factor for computing advancements. Cooling system designs and power supply designs are stretched to the limit to support the growing thermal and power budgets of computing systems. The wide variability in system activity with workload and consequent variability in power consumption imply that while significantly smaller cooling and power resources would suffice for many workloads, systems need to tolerate occasional bursts of activities that require significantly higher capacities for system stability.

Current approaches to system design include careful estimation of maximum individual component power consumption for component-wise budgets and power supply design. These approaches tend to design power supplies to accommodate the sum of all individual power budgets with some educated/experience-based adjustments. In practice, however, component-wise maximum budgets are rarely if ever realized in a system at the same time. This implies that systems are designed with a higher supply and cooling capacity than is required in practice. When system designs get too aggressive to avoid this waste or attempt to reduce cooling and power supply design costs, an opposing problem (i.e., insufficient power supply) may result, especially for short periods of intense workload activity. To prevent permanent system damage, power supplies are designed to shutdown when oversubscribed, which is obviously an undesirable resolution of the problem.

Conventional approaches to limiting power consumption to avoid oversubscribed systems tend to share some or all of the following limitations. Conventional techniques focus on regulating the power consumption and temperature of individual components through component-specific activity regulating techniques. While this approach may be sufficient for addressing problems associated with a single component or addressing problems associated with a system whose power consumption is dominated by a single component, it is not sufficient for larger systems having multiple significant power consumers. Even in a tightly coupled system where activity of a single component can determine overall system activity, the ability to manage multiple components gives greater flexibility and can be more effectively exploited to reduce the performance impact of regulating activity.

Conventional power conservation techniques tend to focus on the management of power states and operating modes of individual/multiple components. While exploiting the power states of computing components is important for power management, it is not usually sufficient for effective power management as it does not address the variability of power consumption with activity for computing components, i.e., there can be significant variation in power consumption of a computing component event within a specific power state based on the level of activity.

Conventional power conservation techniques also tend to require significant enhancement to existing systems to support adherence to a power budget in the face of increased activity.

It would be desirable to provide a power conservation methodology using an approach to ensuring stable operation of the system within significantly lower power budgets and consequently smaller cooling resources while reducing the occasional negative impact of the reduced power budgets on system performance.

SUMMARY OF THE INVENTION

The objective identified above is achieved with a method for managing power in a data processing system having multiple components as disclosed herein. The method includes determining a power budget for the system. Activity levels during a forthcoming time interval are then predicted for each of the components. Using the predicted activity levels, the power budget is allocated among the system components. An activity limit is then established for each component based on its corresponding portion of the power budget. The activity of a component is then monitored and, if the component's activity attempts to exceed the component's corresponding activity limit, it is constrained from doing so. Determining the predicted level of activity may include determining a predicted number of instructions dispatched by a processor component or a predicted number of memory requests serviced for a system memory component. Allocating the power budget includes allocating each component its corresponding standby power and a share of the system power available for dynamic powering based on the expected levels of activity. Monitoring an activity limit may include monitoring a processor performance monitor configured to count the number of instructions dispatched during a timing interval. In this embodiment, constraining the activity of the processor may include pipeline throttling in which the processor is prevented from dispatching additional instructions until the current timing interval expires. Alternatively, constraining processor activity may be achieved by reducing the voltage and frequency applied to the processor.

BRIEF DESCRIPTION OF THE DRAWINGS

Other objects and advantages of the invention will become apparent upon reading the following detailed description and upon reference to the accompanying drawings in which.

Figure 1:
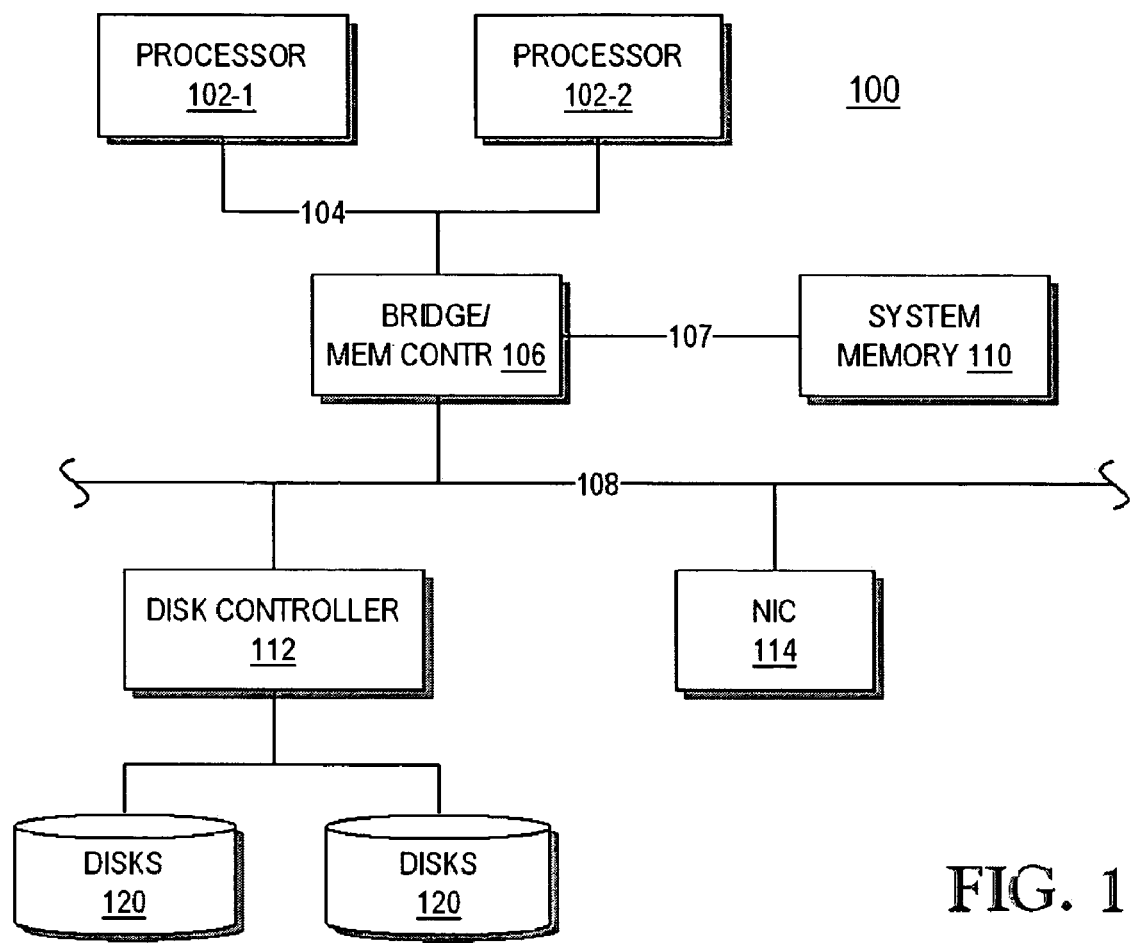
FIG. 1 is a block diagram of selected elements of a data processing system according to an embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

This disclosure describes a method and system for managing power in a data processing system and, more specifically, allocating limited power among multiple system components with a minimal impact on system performance. A power budget is established for the system as a whole. The system predicts the activity of individual system components for an upcoming interval of time. Using knowledge of the relationship between activity and power consumption for each component, the system determines the amount of power required by all of the system components based on the predicted levels of activity. The power estimate for each component is used to then allocate the budgeted power amongst all the components. From the allocated power values, the system determines a limit on the level of activity of each component. The system then monitors the activity levels of the various components. If the level of activity of a component exceeds its limit, the system will throttle or otherwise constrain the activity for the corresponding component.

The components that are likely to participate in this dynamic allocation of power include the system's main processor, system memory, and possibly selected peripheral devices such as hard disk controllers. For a general-purpose microprocessor, the number of instructions dispatched per clock cycle may serve as a proxy for activity. For a memory controller or hard disk controller, a suitable activity measure may be the number of bytes per second (the bandwidth). The system includes hardware or software to monitor the activity proxies and to throttle them when an activity level exceeds its limit. By dynamically predicting activity for multiple components and allocating a power budget based on the predicted activity levels, the system power is optimally distributed to the system components thereby enabling the use of a smaller (lower capacity) power supply. Moreover, the dynamic allocation of power results in a reduced impact on system performance when the system components might require more power than the power supply can deliver. Finally, the system preferably employs or leverages existing system hardware and software utilities to implement activity monitoring and activity throttling.

Before describing features of a specific embodiment, a brief discussion of some benefits of dynamic power allocation across multiple system components is presented. While the dynamic power allocation techniques described are extensible to substantially any system component that (1) consumes significant power and (2) implements a visible and controllable metric for activity levels, some of the following discussion is illustrated with respect to a system in which dynamic power allocation is implemented for one or more main processors and a system memory.

Figure 6:
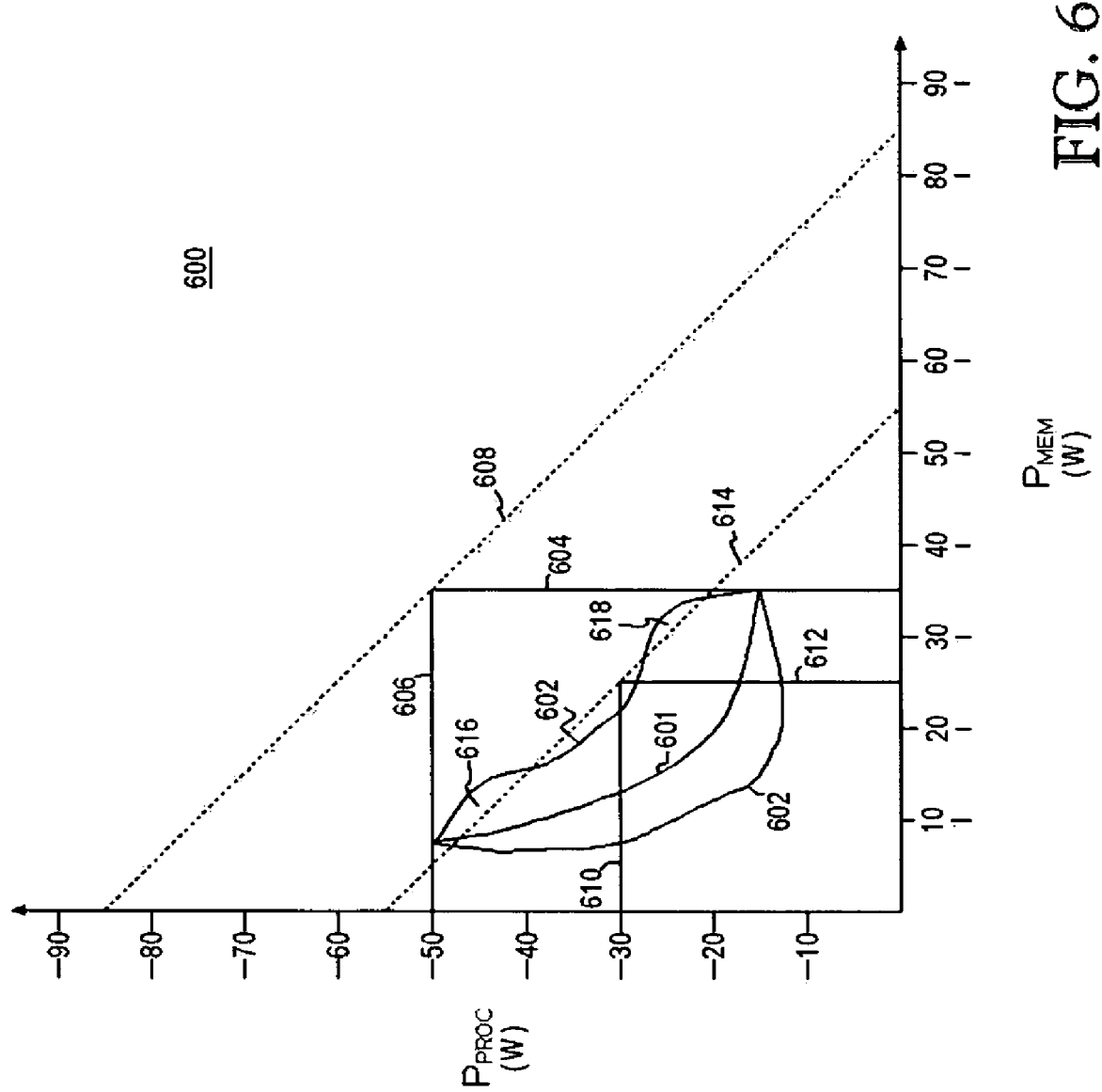
FIG. 6 is a representation of scatter plot data of processor power consumption as a function of memory system power consumption.

Empirical data suggests a relationship among the activity levels of various components in a data processing system that makes dynamic power allocation more efficient than static allocation. More specifically, data suggests that periods of peak processor power consumption are likely to coincide with periods of low memory system power consumption and vice versa. Referring momentarily to FIG. 6, a scatter plot of processor power v. memory power is represented. In the depicted representation, the data points (not shown individually) are contained with the region, referred to herein as the operational space, defined by lines 602 and line 601. Line 601 suggests power consumption attributable to processor activity and power consumption attributable to memory activity exhibit an inverse relationship.

As depicted in FIG. 6, the maximum processor power consumption for any data point is 50 W while the maximum memory power is 35 W. One might allocate an 85 W power supply to guarantee sufficient system power at all times. Lines 606 and 604 depict a specific static implementation of an 85 W power supply in which 50 W is allocated to the processor and 35 W is allocated to system memory. Line 608 represents a dynamic 85 W implementation in which the 85 W is may be shared between the processor and the system memory in any combination. The substantial distance between line 608 and the contours of line 602 indicates that the system does not generally experience a condition in which processor and memory are consuming maximum power simultaneously and that an 85 W power supply is not necessary for the system.

A more aggressive static provisioning implementation (a 55 W implementation) is represented by the region defined by lines 610 and 612 where 30 W is allocated to the processor and 25 W is allocated to memory. While this 55 W implementation has the benefit of a smaller power supply, a significant percentage of the data points lie outside of the defined region. These outlying data points represent conditions in which the allocated power is insufficient for the processor or insufficient for the memory.

Line 614 represents a dynamic 55 W implementation. In this dynamic implementation the system power may be allocated to processor and memory in any combination totaling 55 W. In sharp contrast to the static 55 W implementation represented by lines 610 and 612, very few data points lie "outside" of line 614. While there are small regions (e.g., 616 and 618) of data points that exceed 55 W total, the great majority of the operational space is within the dynamic 55 W line 614. The difference in operational space coverage between the dynamic 55 W implementation represented by line 614 and the static 55 W implementation represented by lines 610 and 612 graphically illustrates the benefits of a dynamic allocation of power in a data processing system that has multiple components of significant power consumers.

Referring now to FIG. 1, a block diagram of selected elements of a data processing system 100 suitable for implementing an embodiment of dynamic power allocation is presented. In the depicted embodiment, system 100 includes first and second general purpose microprocessors 102-1 and 102-2 respectively (generically or collectively referred to herein as processor(s) 102). Processors 102 are connected to a shared system bus 104 and enjoy symmetric or equivalent access to a shared system memory 110 via a bridge/memory controller 106. System 100 is sometimes referred to as a symmetric multiprocessor (SMP) system.

Bridge controller 106 provides an interface between system bus 104 (and processors 102) and a peripheral or I/O bus 108. Various I/O devices or adapters may be connected to I/O bus 108. In the depicted implementation, for example, system 100 includes a disk controller 112 and a network interface card (NIC) 114 connected to I/O bus 108. Disk controller 112 controls one or more physical disks 120 while NIC 114 enables system 100 to connect to an external network (not depicted). As depicted in FIG. 1, system 100 includes multiple components that consume substantial system power including processors 102, system memory 110, and disk controller/disks 112 and 120. The dynamic power allocation described herein is suitable for allocating power dynamically between or among two or more components in a system. Although the description that follows uses the relatively simple case of dynamic power allocation between processors 102 and system memory 104, the technique may be extended to encompass any component that draws significant power and incorporates some for of utility for measuring and throttling or controlling activity.

System 100 as depicted in FIG. 1 is only one example of the type of system for which the power management techniques disclosed herein are applicable. The disclosed power management method is also applicable to single-chip systems in which multiple types of components (e.g., processor cores, cache memories, and the like) are integrated within a single piece of silicon, multi-component systems within a single computer (e.g., multi-processor systems with shared or distributed system memory), and multi-machine systems (e.g., multiple uniprocessor or mulitprocessor computers within a cluster).

Figure 2:
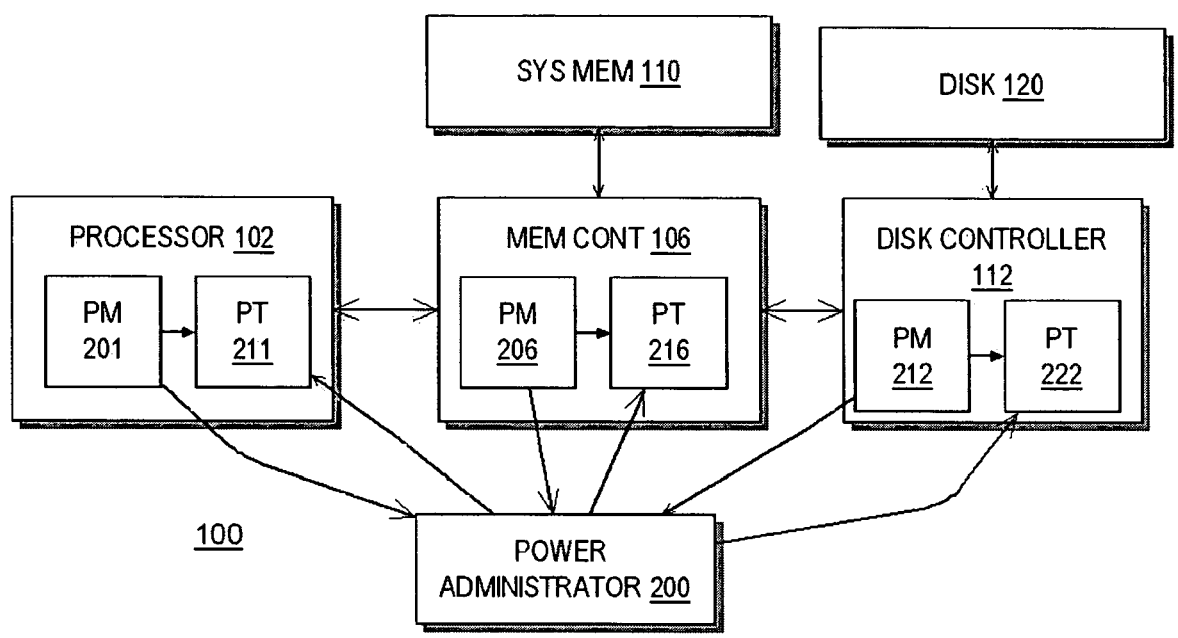
FIG. 2 is a block diagram of the system of FIG. 1 emphasizing the hardware/software modules required to monitor component activity levels and throttle the activity levels when needed.

Turning now to FIG. 2, selected elements of data processing system 100 are depicted in somewhat greater detail to emphasize facilities desirable for use in implementing dynamic power allocation. As depicted in FIG. 2, the processors 102 of FIG. 1 (only one of which is depicted) include a performance monitor 201 and a performance throttle 211. Similarly, memory controller 106 includes a corresponding performance monitor 206 and performance throttle 216, and disk controller 112 includes a corresponding performance monitor 212 and performance throttle 222.

The performance monitors 201, 206, and 212 and the performance throttles 211, 216, and 222 communicate with a dynamic power allocation administrator 200. Dynamic power allocation administrator 200 (also referred to herein simply as power administrator 200) allocates the available power to system components based on predicted levels of activity for each component. Power administrator 200 also enforces the allocated power budget by monitoring the activity of the various components and constraining or throttling the activity of any component that exceeds its power allocation. All or part of power administrator 200 may be implemented as computer executable instructions stored on a computer readable medium. In other embodiments, power administrator 200 may be implemented as an integrated or separate on-chip/on-board programmable or hard-coded microcontroller.

In the embodiment depicted in FIG. 2, power administrator 200 monitors component activity using performance monitors (PM's) 201, 206, and 212 and throttles activity using performance throttles (PT's) 211, 216, and 212. Performance monitors 201, 206, and 212 may be implemented as programmable registers for counting or otherwise monitoring the occurrence of certain performance indicating events. An exemplary processor performance monitor 201, for example, is a software accessible hardware register configured to count the occurrences of various processor events. Because performance monitors are included in a growing number of server class general purpose microprocessors, this implementation does not require substantial modification of processor 102. Similarly, memory controller 106 and disk controller 112 preferably include registers or other facilities for monitoring performance indicating activity of the their respective components.

The dynamic power allocation techniques described herein may be based on any of a number of performance indicating activities. The activity indicator selected for a component preferably exhibits good correlation with the component's power consumption. The implementation described in this disclosure uses the number of instructions dispatched by the processor as an activity indicator for the processor and the number of bytes per second traversing memory bus 107 (bandwidth) as an activity indicator for system memory 110. Empirical evidence suggests, in fact, the processor power is a linear function of instructions dispatched and that bandwidth is a linear function of memory system power. An analogous activity indicator for disk controller 112 is conceivable as well. Regardless of the specific activity indicator or indicators selected, the dynamic power management process described herein includes using the activity indicator as a proxy for power consumption and restraining or throttling the component when the activity indicator exceeds a determined limit or threshold.

The performance throttling modules 211, 216, and 222 are software/firmware modules that cause a forced reduction in power consumption, generally by causing a forced reduction in component activity. Performance throttling for a processor 102, for example, may include limiting the number of instructions dispatched within a specified interval. Similarly, throttling a system memory 110 may include limiting the number of memory requests serviced during the specified interval. Once a component that is subject to an activity limit reaches that limit, further activity is prohibited until the interval is over. Variations of this method may include methods in which a small "reserve" of activity is permitted after a component has reached a limit, to service high priority activity. For example, a processor might be subject to a limit of N instructions dispatched per M (in units of time). After the number of instructions reaches a critical level (e.g., 98% of N), instruction dispatch is halted for all but the highest priority dispatch instructions, which may continue to be dispatched until the full limit of N instructions is reached or until the interval terminates. These techniques are referred to generally as pipeline throttling techniques.

Performance throttling (i.e., power conservation) may be achieved using techniques other than pipeline throttling. Performance can be throttled, for example, by clock signal throttling. Clock throttling may include altering the duty cycle of a clock signal provided to a component or by gating the clock pulses. As another example, processors 102 may support voltage and frequency scaling as part of the processor's power conservation implementation.

For devices supporting sophisticated power reduction techniques such as voltage and frequency scaling, the method for increasing performance by dynamically allocating the power budget of a system among multiple components is equally applicable when using activity regulation mechanisms other than pipeline throttling. What is needed is a clear understanding of the power and performance trade-offs for different levels of the regulation mechanism and the workload requirements. This can be obtained by good modeling, empirical characterization or a combination of both.

One example of an alternative activity regulation technique is voltage-frequency scaling. Compared to pipeline throttling, voltage-frequency scaling may be a more efficient technique because reducing the voltage in conjunction with the frequency, one can obtain a cubic (with respect to frequency) reduction in active power. In addition, reducing the voltage for the circuits also reduces key components of the static/leakage power, further improving efficiency. However, dynamic voltage and frequency scaling (DVFS) is often a more complex regulation mechanism to implement because of twin controls of voltage and frequency and, so, changes initiated by it can be slower to take effect than with pipeline throttling.

Outlined below is an approach to using DVFS instead of pipeline throttling as the processor activity regulation mechanism. For this discussion:

a) Pproc=Polynomial(f,V)=Poly-active(f,V)+Poly-static (V) processor power is a polynomial function of frequency and voltage, with Poly-active(f,V) accounting for the active portion of the power and Poly-static(V) accounting for the static portion of the power. Since there is a definite relationship (typically linear) between voltage and frequency for the specific technology/circuit used in the processor, one can mathematically express the processor power Pproc=G(f)+Pmin where G(f) is a polynomial in f with all voltage dependency converted to a frequency dependency from the known voltage-frequency relationship, Pmin is the minimum operational power of the processor at its lowest operating point.

Note that G(f) also includes the 'static' portion of power that is impacted by a change in voltage for a given change in frequency.

b) Pmem=M1$s$*BW+M1$c$, here M1$s$ is the scaling factor for memory power with bandwidth and M1$c$ is the static component of memory power.

c) IPC=Linear(f)–IPC is a linear function of processor frequency (with a corresponding well-defined inverse function f=InverseLinear(IPC). One can factor out the workload dependency of this function by using a sophisticated performance model that includes the impact of the memory hierarchy usage (stalls etc) when deriving this function.

As in the case when one uses pipeline throttling, if one has two independent frequency-scalable processors using a single memory (DRAM) system, let IPC1, IPC2, and BW1 be the utility estimated for processor 1, processor 2, and memory. Also let, F1 be the frequency such that IPC1=Linear (F1) and F2 be the frequency such that IPC2=Linear(F2). Then the associated estimated variable power for each of processor 1, processor 2 and memory are P1pwr=G(F1) (Pmin is fixed and not part of the variable power)
P2pwr=G(F2)
M1pwr=M1$s$*BW1, respectively.

Of the total power budget B, the fixed portion of the power is Pfixed=Pmin1+Pmin2+M1$c$.

One can again distribute the total variable portion of the power among the components in the ratio of their estimated power for their desired utilities.

So the component power limits will be:
P1Pwrlimit=(B−Pfixed)*P1pwr/(P1Pwr+P2Pwr+M1Pwr)+Pmin1 and so on.

The actual frequency setting for processor 1 for this power limit can be computed as $G^{-1(P1Pwrlimit-Pmin1)}$.

Figure 3:
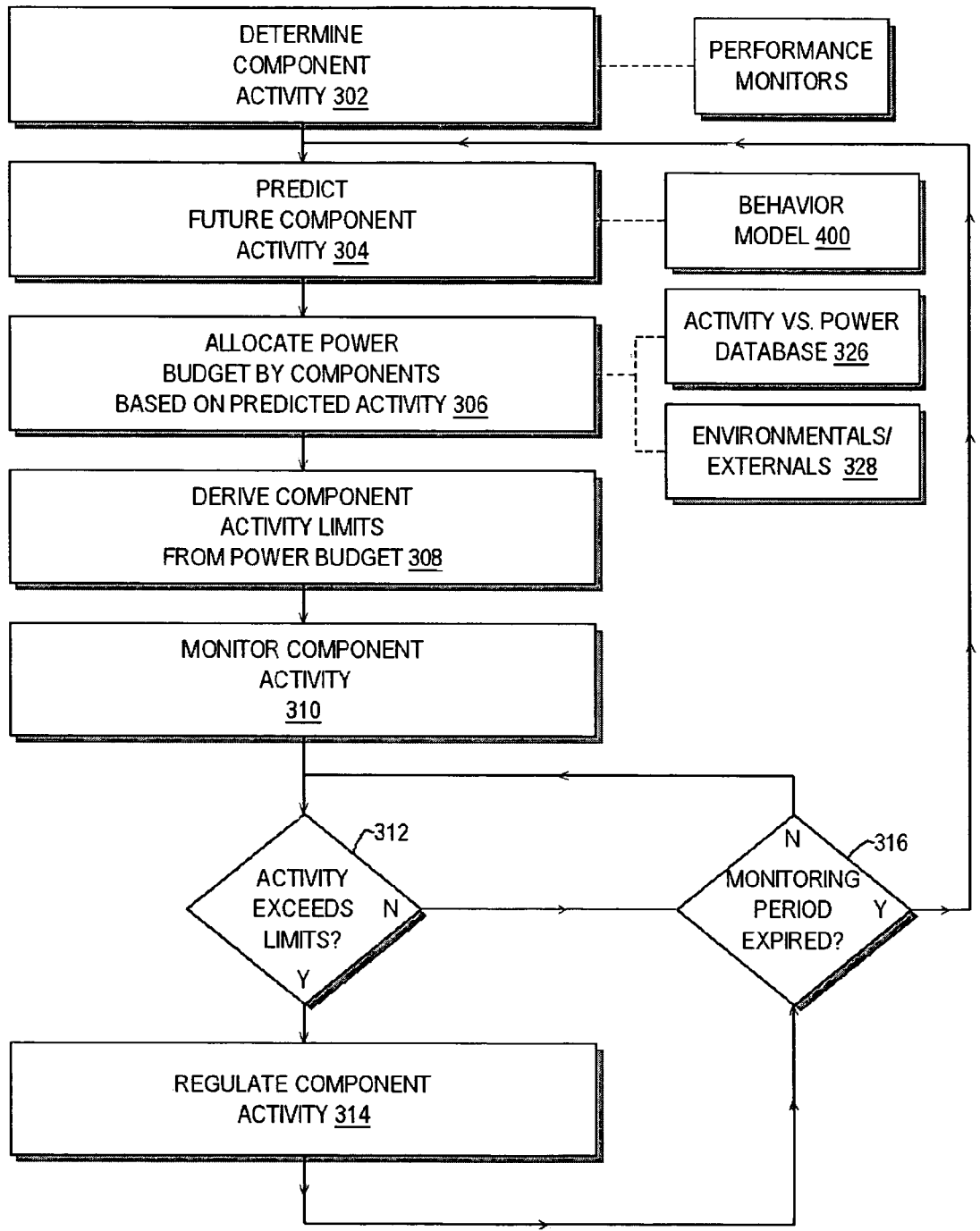
FIG. 3 is a flow diagram of a method of dynamically managing power in a multi component system.

As indicated previously, power administrator 200 of FIG. 2 may be implemented as computer executable instructions (software) stored on a computer readable medium. In such embodiments, power administrator 200 may be illustrated conceptually by a flow diagram that represents the operations that occur when power administrator 200 is executed. Referring now to FIG. 3, an exemplary implementation of power administrator 200 is depicted as flow diagram 300. In the depicted embodiment, power administrator 200 includes computer executable instructions for determining (block 302) for each component in the dynamic power allocation domain. Power administrator 200 is not required to dynamically allocate power to all components of the system, but is instead preferentially directed to manage the power dissipation of the major components (i.e., the components that consume the bulk of the available power). Determining component activity is preferably achieved using the same monitors that are used to determine when a component is exceeding its budgeted power, namely, performance monitoring hardware. Power administrator 200 may, for example, count the number of qualifying events (events that count as an activity) during a specified duration.

Power administrator 200 also predicts (block 304) future component activity. Predicting the future activity of a system components may include relatively simple prediction techniques in which, for example, the predicted activity for time period N+1 is a simple function of the monitored activity for time period N (or for another recent time period). In perhaps the simplest implementation, the predicted activity for time period N+1 is the measured activity for time period N. This approach relies on the not unreasonable assumption that very recent activity is a good predictor of current activity. This approach is also desirable for its responsiveness in the context of a rapidly changing operating environment. Other activity prediction techniques may include invoking a behavior model 400.

Figure 4:
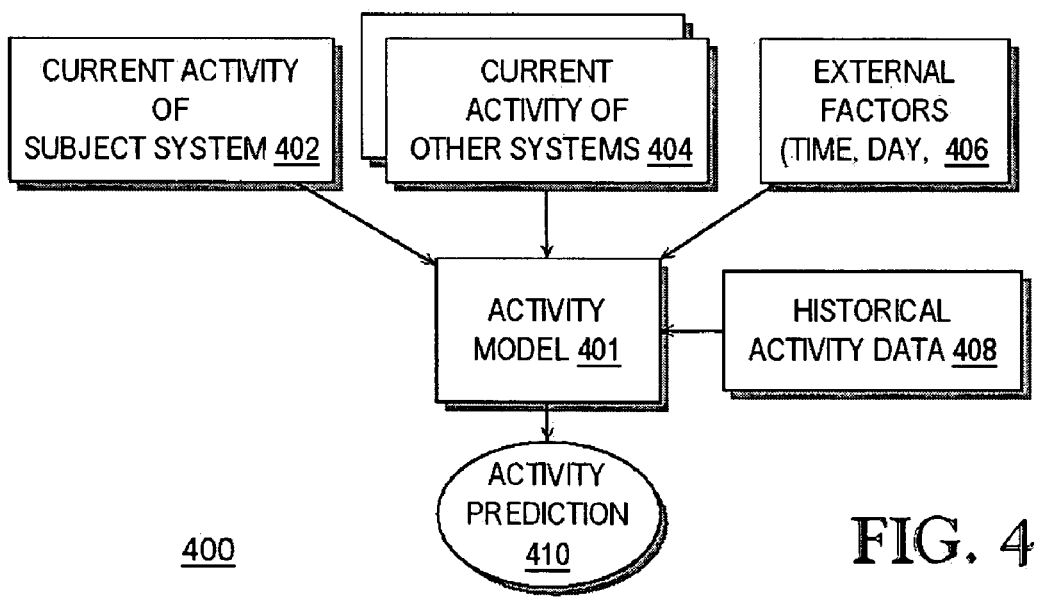
FIG. 4 is a block diagram of selected elements of a unit suitable for predicting the level of activity associated with a component for a future timing interval.

Referring to FIG. 4 momentarily, a block diagram of selected elements of a behavior model 400 includes an activity modeling module 401 that receives input in the form of current activity inputs 402 and 404, external factors 406, and historical activity data 408. Current activity inputs 402 indicates the current activity levels of the subject component (the component for which activity is being predicted) whereas activity inputs 404 represents the activity levels of other components in the dynamic power allocation domain. External factors 406 may include factors such as the time of day, day of week, and the like.

Historical activity data 408, as its name suggests, includes archived activity data for one or more of the system components. Activity model 401 processes all or some of these inputs to generate an activity prediction 410 that is used to develop a power allocation for the corresponding component. Activity model may incorporate substantially any prediction technique or prediction algorithm that is compatible with the timing requirements of power administrator 200 (i.e., the prediction algorithm should not create a bottle neck for power administrator 200).

Returning to FIG. 3, power administrator 200 includes allocating (block 306) power budgets to the various system components based on the predicted level of activity. In the depicted embodiment, allocating of power budgets in block 306 utilizes a database (326) that includes information enabling one to convert activity levels for a specific component into a power consumption estimate for that component. Database 326 may be, for example, an empirically derived lookup table or a more complex predictive model of power consumption as a function of activity. Database 326 may be a "generic" database to be applied to all devices of a particular type. In other embodiments, however, database 326 may reflect device specific characteristics that influence a device's power consumption relative to other similar devices. If, for example, a particular processor was processed with minimum transistor dimensions, that processor might consume more power for a given level of activity than a similar processor fabricated with nominal transistor dimensions. This information might be captured in database 326. In the depicted embodiment, power allocation in block 306 is further influenced by environmental or external conditions 328 such as the ambient temperature to reflect that a specified level of activity may translate into a higher level of power consumption at higher temperatures.

External conditions 328 may also include information regarding the power supplied by the public or private utility or power company. Power companies may adjust the cost of power based, at least in part, on the instantaneous demand for power such that power consumed during peak demand hours is more expensive than at other times. Similarly, a power company and one or more of its customers may contract or otherwise agree to alternative power arrangements including arrangements in which customers agree to a reduced (or zero) supply of power during peak demand hours in exchange for a lower cost of power during other hours. If a customer is a party to such an agreement, external conditions 328 may include information regarding the agreement. In such cases, power allocation block 306 may reduce the power allocated to one or more components during periods of reduced power supply or increased power cost.

Another example of an external factor is an anticipated alteration or adjustment of the power supply provide to the system by a public or private utility or power company. Power companies may enter into agreements with customers to regulate the amount of available power supplied to the customer. A customer may agree to a constrained power arrangement in exchange for a reduced rate for power. During periods of peak consumption, for example, limited or no power would be supplied to such a customer. Behavior model 400 of FIG. 4 might incorporate this information into its predictive model.

Figure 5:
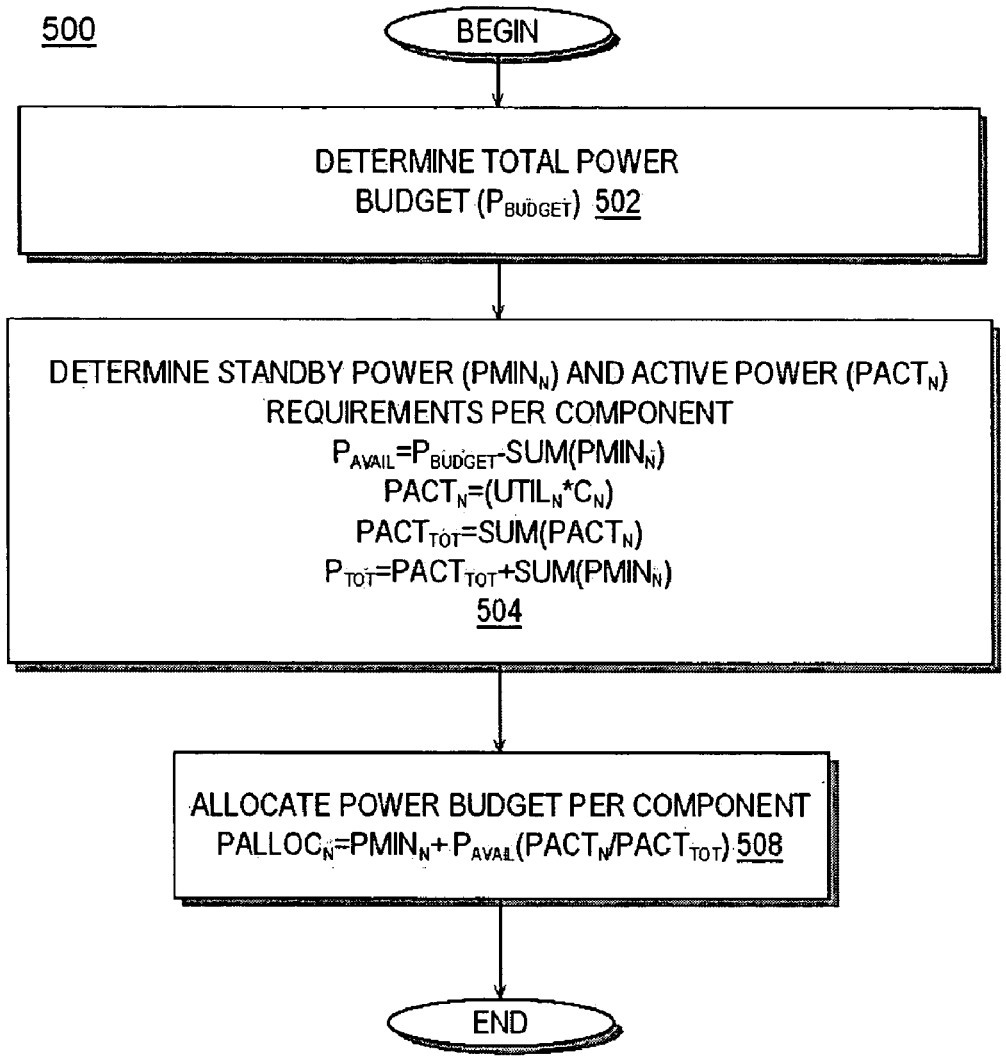
FIG. 5 is a flow diagram of a method for allocating power budgets to the system components based on expected levels of activity.

FIG. 5 depicts additional details of a method 500 for allocating power according to one embodiment. In the depicted embodiment, method 500 includes determining (block 502) the total power budget ($P_{BUDGET}$) of the system. This operation may require nothing more than retrieving a static value indicating the maximum rating of the system power supply. In other cases, determining the maximum power may include determining the power that the power supply is currently capable of delivering and may take into consideration external factors such as the ambient temperature and the like, possibly in conjunction with a cooperating service processor, management module, or both.

In block 502, the system determines a set of values required to properly allocate the total power budget. The set of values determined in block 504 includes the standby values (minimum power values) of each system component. Using the standby values, an available power figure ($P_{AVAIL}$) is determined by subtracting from the maximum power deliverable by the system the sum of all the standby values. Under the assumption that each component always draws its standby or minimum power, $P_{AVAIL}$ represents the amount of power that is available for dynamic allocation.

As depicted in FIG. 5, allocating the system power includes using the values of predicted activity generated in block 304 (FIG. 3) to compute the amount of active power per component expected during the upcoming interval. These computations require knowledge of the relationship between the monitored activity and the component's power consumption. The implementation illustrated in FIG. 5 uses a linear model for the processor and memory components. Specifically, the active power predicted for a component N is indicated as the product of the activity (UTIL) predicted for component N ($UTIL_N$) and a constant of proportionality for component N ($C_N$).

Method 500 thus includes determining the expected level of active power consumption required by each component N. From this set of calculations, the total amount active power expected to be required for an upcoming interval ($PACT_{TOT}$) is computed as the sum of the individual component's expected active power. Having thus determined the total expected active power and the total amount of standby power required, method 500 includes determining the total required power ($P_{TOT}$) for all components as the sum of the total active power $PACT_{TOT}$ and the total standby power required SUM ($PMIN_N$).

Having determined the power budget and the active and standby demands of each of the components, the depicted embodiment of method 500 includes allocating (block 508) power to the system components. In the embodiment depicted in FIG. 5, for example, power is allocated to the various components used a modified pro rata technique. More specifically, the amount of power budgeted for each component is equal to the component's standby power requirements (which must always be met) and a portion of the available power $P_{AVAIL}$. The portion of $P_{AVAIL}$ allocated to a system is determined by the ratio of the components active power requirements to the total active power requirements of the system. This formula is represented in block 508 as $PALLOC_N=PMIN_N+P_{AVAIL}*(PACT_N/PACT_{TOT})$. This formula effectively distributes the available system power to the system components in a manner that (1) ensures that each component receives a minimum level of power and (2) allocates the available active power in proportion to the requirement for the components by the workload(s) executing on the system. The formula expressed in block 508 represents a technique for distributing scarce system power equitably so that the system performance of each component is impacted proportionately.

If $P_{TOT}$ is less than or equal to $P_{BUDGET}$, the allocation of FIG. 8 effectively "over allocates" power to each component (i.e., budgets more power for a component than the component is expected to require). Over allocating when $P_{BUDGET}$ is greater than $P_{TOT}$ provides a degree of margin that prevents performance throttling when the actual activity for a component exceeds the expected activity. It should be noted here that the allocation of power does not imply that system power is actually distributed to the components in a manner that enforces these derived power budgets for each component. Instead, the power budget figures for each component are used to then determine corresponding activity limits for each component. The activity limits represent the parameter that the system is capable of monitoring and altering.

In the case where $P_{TOT}$ is greater than $P_{BUDGET}$, the system power supply is not capable of delivering to each component that power it requires to operate in an unconstrained state. Under these conditions, block 508 allocates to each component a power budget that is somewhat less than the power required to accommodate the expected level of activity for the corresponding component. This technique has the effect of distributing performance throttling among multiple components of the system so that the overall performance penalty is reduced.

Thus, returning to FIG. 3, after power budget figures are determined for each of the system components, power administrator 200 includes deriving (block 308) component activity limits that correspond to the power budgets allocated in block 306. Deriving the activity limits is preferably achieved using the same power v. activity relationship that was described previously. In the linear model of activity v power referred to previously, the activity level associated with any allocated value of system power is easily determined.

After maximum activity levels are established in block 308, power administrator 200 then monitors (block 310) the activity indicators for the system. As long as the activity levels remain below their respective limits, monitoring continues and no additional action is taken. If, however, a condition occurs in which the activity level of one or more systems would exceed (block 312) its corresponding limit, component activity is then throttled or otherwise regulated (block 314). Activity throttling may include simply preventing further activity of substantially any kind by the component until the next monitoring interval begins. In other embodiments, activity throttling may include selectively preventing further activity until the interval terminates. Specifically, in these other embodiments, throttling may include leaving a reserve for high priority activity. As an example, the processor activity limit for a given interval may be specified as a number of instructions dispatched (N). If the number of instructions dispatched during an interval approaches (but does not actually reach) the specified limit (e.g., 0.98N), further dispatches may be substantially halted unless a priority associated with a subsequent request is so high as to justify dispatching the instruction during the current interval. Alternatively, a reservoir for minimal component activity can be included in the 'standby' power allocated for the component to ensure there is always enough power for each component to obtain some minimal work from it. In still other embodiments, activity throttling may include clock throttling or more sophisticated throttling techniques such as the voltage-frequency throttling described above.

Monitoring activity levels for each component in the dynamic power allocation domain continues in this manner until the current monitoring interval expires (block 316). When the current interval expires, power administrator 200 generates new predictions for the next upcoming period in block 304 and the process repeats itself indefinitely. By implementing and supporting a technique for dynamic power management across a plurality of heterogeneous system components, the present invention enables reduced power consumption with a reduced impact on system performance by recognizing that system components do not generally use power at the same time.

It will be apparent to those skilled in the art having the benefit of this disclosure that a method and system for dynamically monitoring and allocating system power in a multi-component system is described. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method for managing power in a data processing system having at least one processor component and a memory component, comprising:
   determining a power budget for the system;
   determining a predicted level of activity for the processor and memory components;
   based on said predicted level of activity, allocating a corresponding portion of the power budget to the processor and memory component, wherein allocating the portion of the power budget includes allocating each component its corresponding standby power and a pro rata share of the system power available for dynamic powering based on the expected levels of activity;
   determining an activity limit for each processor and memory component based on the corresponding allocated portion of the power budget; and
   monitoring the activity of the processor and memory components and, responsive to determining activity in excess of a component's corresponding activity limit, constraining the activity of the component.

2. A method for managing power in a data processing system having at least one processor component and a memory component, comprising:
   determining a power budget for the system;
   determining a predicted level of activity for the processor and memory components;
   based on said predicted level of activity, allocating a corresponding portion of the power budget to the processor and memory component;
   determining an activity limit for each processor and memory component based on the corresponding allocated portion of the power budget; and
   monitoring the activity of the processor and memory components wherein monitoring an activity limit includes monitoring a processor performance monitor configured to count the number of instructions dispatched during a timing interval, and, responsive to determining activity in excess of a component's corresponding activity limit, constraining the activity of the component, wherein constraining activity comprises preventing the processor from dispatching additional instructions or constraining the rate of dispatching instructions until a current timing interval expires.

* * * * *